Dec. 24, 1935.  G. BUELNA  2,025,267

SPRINKLER

Filed April 16, 1935  2 Sheets-Sheet 1

INVENTOR:
GUADALUPE BUELNA
BY: [signature]
ATT.

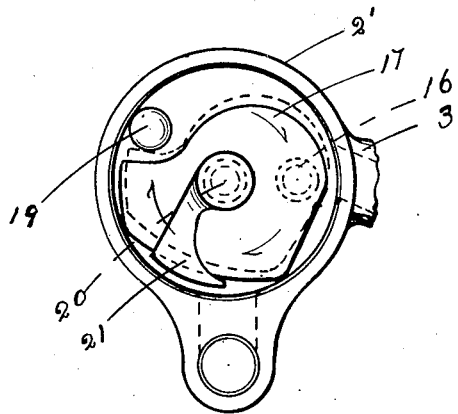
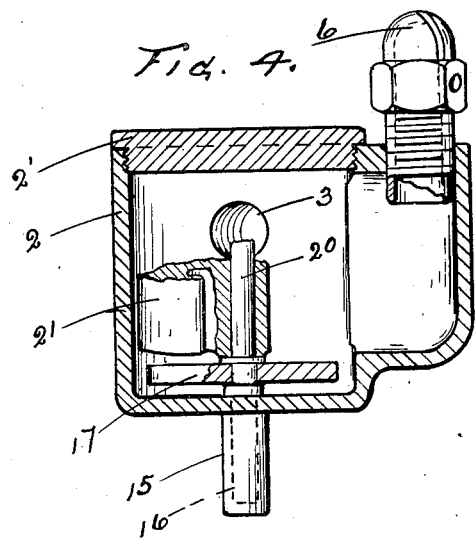
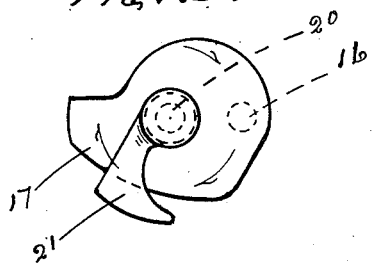
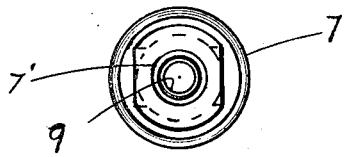
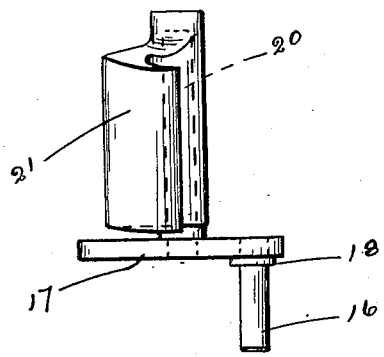

Patented Dec. 24, 1935

2,025,267

UNITED STATES PATENT OFFICE 2,025,267

SPRINKLER

Guadalupe Buelna, Santa Barbara, Calif., assignor of one-half to H. E. J. Vacher, Santa Barbara, Calif.

Application April 16, 1935, Serial No. 16,590

8 Claims. (Cl. 299—64)

My invention relates to irrigating devices and particularly to sprinklers of the rotating type, the principal objects of the invention being to provide a simple and effective sprinkler means which will distribute the greatest amount of water over the greatest area and thoroughly irrigate the area, using a part of the force of the water to rotate the sprinkler in a steady manner and controlling the force of the water to regulate the rotative movement of the sprinklers.

Other objects will appear from the subjoined specification, in connection with the accompanying drawings, which illustrate a preferred form of embodiment of the invention, and in which Fig. 1 is an elevational view.

Fig. 3 is a plan view of one of the chambers with the cap removed and showing the means for producing the rotation of the sprinkler, the view being taken on lines 3—3 of Fig. 2.

Fig. 4 is a vertical section on lines 4—4 Fig. 2.

Fig. 5 is a plan detail of the means for producing rotation of the sprinkler.

Fig. 6 is an elevation of the means shown in Fig. 5 and

Fig. 7 is a plan view of the axle or spindle about which the sprinkler body rotates.

Figure 1:
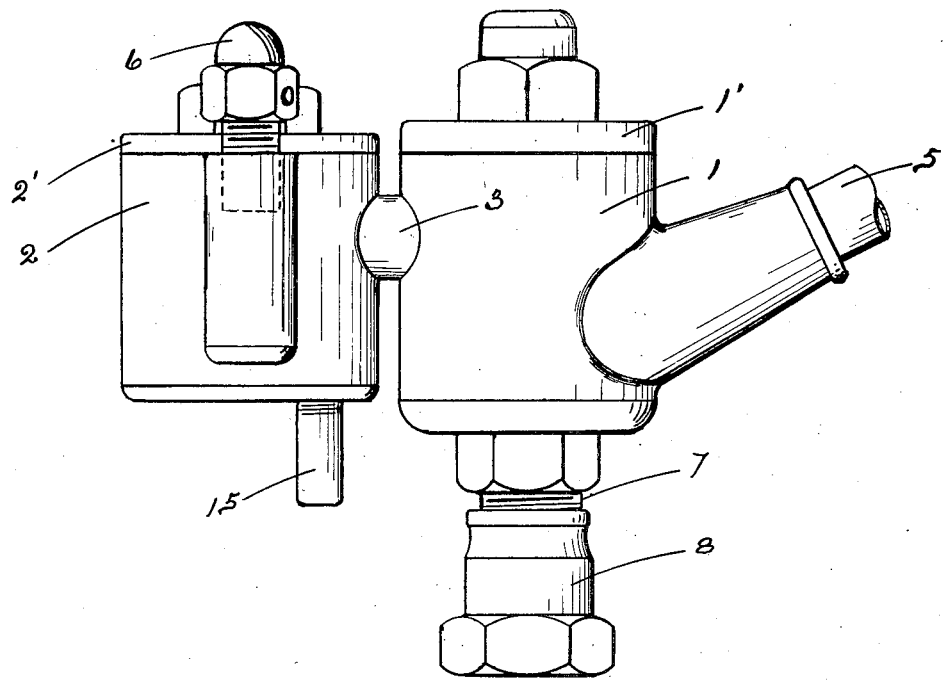

The invention comprises two chambers 1 and 2, each provided with a cap 1' and 2', the chambers being in communication with each other through a pipe 3 which conjoins them near the top and through which the water is dispensed from the chamber 1 to the chamber 2 in regulable quantity for purposes to appear hereinafter, through a valve 4 that is threadedly engaged in said pipe 3 and that produces a tangential discharge of the water within said chamber 2.

Each of said chambers 1 and 2, is respectively provided with a nozzle 5 and 6, the latter being adjustable to alter desirably the angle of discharge of the water and thus control the speed of rotation of the sprinkler, as hereinafter pointed out.

Figure 2:
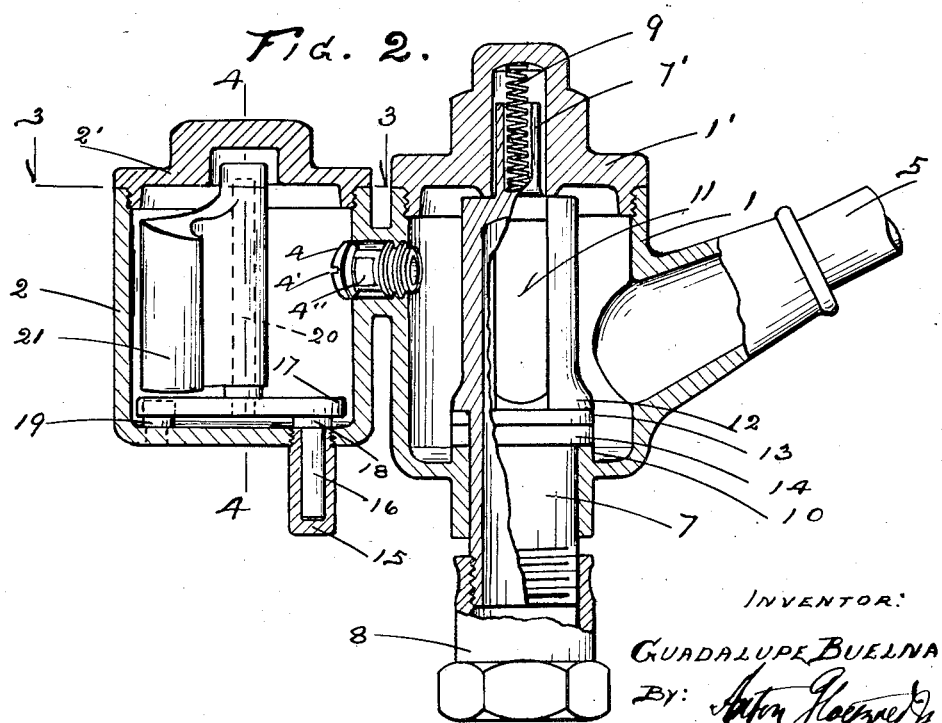
Fig. 2 is a sectional elevation.

The chamber 2 is mounted for rotation upon a vertical axle or spindle 7, which is hollow and which is threadedly connectible with a source of water under pressure or to a coupling 8 as shown in Figs. 1 and 2 which may form a part of portable fixture for mounting the sprinkler. Through this spindle the water is conducted to the chamber 1 from which the major portion is dissipated through nozzle 5 while a lesser portion is passed through the valve 4 into the chamber 2 from which it is dissipated through nozzle 6 after operating the means by which the sprinkler is rotated.

The spindle 7 is formed at the top with a tubular portion 7' for housing a spring 9 that is arranged to be held in compression against the top of said spindle 7 by the cap 1' which as shown in Fig. 2 is socketed to receive said spring and tubular portion 7'. The chamber 1 is formed with an annular seat 10, and the spindle 7 is formed with a plurality of ports 11 through which the water enters the chamber 1 and an annular shoulder 12 between which and said seat 10 are pressed by said spring 9 a compressible washer 13 and a non-compressible washer 14, forming in this wise a water tight engagement and preventing at all times ingress of sand and other wearing accumulations between the bearing surface 10 and 14 and the shoulder 12 and compressible washer 13. The spindle 7 as shown, and explained forms the bearing around which the chambers 1 and 2 are rotatable and the means for rotating the chambers 1 and 2 are contained in the chamber 2, and are actuated by a portion of the water delivered to said chamber 1, such portion as explained passing in controllable measure through the valve 4 in the pipe 3 which interconnects the two chambers 1 and 2.

The bottom of the chamber 2 is provided at one side thereof with a socket 15 which journals the pivot 16 of a lever, hammer or striker 17, a collar 18 being provided to separate and elevate the hammer or lever 17 from the floor of the chamber 2 and provide thereby substantially a non-frictional operation of said hammer 17 between one wall of the chamber 2, as shown in Fig. 3, and a stud 19 eccentrically located with respect to the bearing 7 upstanding from the floor of said chamber, as presently explained. Said lever or hammer 17 is provided with a vertical pin 20 which is eccentrically disposed with respect to the pivot 16 of said striker 17 and which journals a water impelled member 21 that, as it passes the pivotal center of the striker or hammer 17 under the flow of the water, oscillates said hammer or lever and alternately sets and operates said hammer to deliver a continuous series of taps or blows against the stud 19 thus moving said chambers rotatively in step like continuity. The speed of rotation of the member 21 within the chamber 2 governs the speed of revolution of the chambers 1 and 2 and this rotative speed of the member 21 is controlled by the volume of water passing from the chamber 1 into the chamber 2 and this volume of water is controlled by the valve 4, which as seen in Fig. 2, is a short cylindrical body preferably threading in said pipe 3 and closed at one end, the closed end being provided with a kerf 4' for a tool by which the valve may be turned. The body 4 is provided with a lateral port 4" through which the water from the chamber 1 passes tangentially into the chamber 2, thereby producing a whirl within the chamber 2 by which the member 21 is rotatively impelled.

With high or reasonably high water pressure, the frequency of the hammer blows against the stud 19 is great and consequently the rotation of the chambers 1 and 2 is rapid. In many cases rapidity of rotation is not desirable and while the speed may be controlled by the volume of water admitted to the chamber, this expedient must be coupled with a curtailment of water with resultant inefficient wetting. The speed of rotation of the chambers may be efficiently and flexibly regulated by adjustment of the nozzle 6 to cause the jet of water issuing from it to parallel the jet discharging from the nozzle 5 or to discharge in any radius at an angle to the jet from the nozzle 5. A jet of water from the nozzle 6 that is parallel to the jet from the nozzle 5 acts to retard the rotation of the chambers, and the retarding influence of said jet 6 diminishes as the angle thereof with respect to the jet 6 becomes greater, a right angular discharge or nearly one assisting, rather than retarding, the hammer 17 to rotate the chambers 1 and 2, by its reactive force which is employed only when the water pressure is low. This is a very convenient and satisfactory control without in any wise reducing the water discharged.

What I claim, is:

1. A sprinkler comprising a pair of communicating chambers each of said chambers having a sprinkler nozzle, a hollow bearing for one of said chambers attachable to a source of water supply for conducting water into one of said chambers, means for conducting a portion of the water from said chamber tangentially into the other chamber, a lug in said other chamber eccentrically disposed with respect to said hollow bearing, a striker pivoted in said other chamber and having a limited movement between said lug and the side of said other chamber, and a member journaled on and eccentrically with respect to the pivot of said striker and rotatable by the water passing through said other chamber to cause said striker continuously to tap against said lug and thereby to produce a step-by-step rotation of said chambers about said bearing.

2. A sprinkler comprising a pair of chambers, each provided with a sprinkler nozzle, a hollow bearing for one of said chambers and connectible to a source of water supply for conducting water into said first named chamber, means for conducting a portion of the water in said first named chamber into the other chamber and at a tangent, a lug upstanding from the floor of said other chamber and eccentrically disposed relatively to said hollow bearing, a striker pivotally mounted in the floor of said other chamber, and a member journaled on and eccentrically with respect to the pivot of said striker and rotatable thereon by the water passing through said second chamber to cause said striker to oscillate against said lug and thereby to produce a step-by-step rotation of said chambers about said bearing.

3. A sprinkler comprising a pair of communicating chambers each provided with a sprinkler nozzle, a pipe connectible to a source of water supply for conducting water into said chambers and discharging it through said nozzles, said pipe forming a bearing for one of said chambers, means to cause the water to enter the other chamber at a tangent a lug within the other chamber and eccentrically disposed relative to said bearing, a means having a limited movement within said chamber and arranged to strike said lug and thereby rotate said chambers about said bearing, and means journaled on and eccentrically with respect to the pivot of said strike means and rotatable by the water passing through said other chamber to oscillate said strike means.

4. A sprinkler comprising a pair of chambers each provided with a nozzle, a hollow bearing for one of said chambers connectible to a source of water supply for conducting water into one of said chambers and discharging it through the nozzle thereon, a pipe connecting said chambers near the top for tangentially dispensing to said second chamber a portion of the water delivered to said first chamber and discharging it through the nozzle on said second chamber, a valve in said pipe to govern the quantity of water dispensed from said first chamber to said second chamber, a lug in said second chamber eccentrically disposed relative to said hollow bearing, a striker pivoted at one side in said second chamber, and a rotor mounted on and eccentrically with respect to the pivot of said striker and operable by the water passing through said second chamber to operate said striker continuously against said lug thereby to produce a rotation of said chambers about said bearing.

5. A sprinkler comprising a pair of chambers each provided with a nozzle, a hollow bearing for one of said chambers attachable to a water supply for conducting water to one of said chambers and discharging it through the nozzle thereon, a pipe connecting said chambers near the top thereof for conducting a portion of the water from said first named chamber tangentially to the other chamber and discharging it through the nozzle thereon, a valve in said pipe to govern the quantity of water passing from said first chamber to said second chamber, a lug in said second chamber eccentric relative to said hollow bearing, a striker pivoted in said second chamber, and a rotor pivoting eccentrically on said striker and operable by the water passing through said second chamber to cause said striker continuously to strike said lug and thereby produce a rotation of said chambers.

6. A sprinkler comprising a primary chamber having a fixed nozzle, a hollow bearing therefor attachable to a water supply for conducting water thereto and discharging it through said nozzle, a secondary chamber connected to and communicating with said primary chamber for receiving a portion of the water conducted to said primary chamber, a nozzle on said secondary chamber through which the water is continuously discharged from said secondary chamber, a lug in said secondary chamber eccentrically located with respect to said hollow bearing, and mechanism operated by the pressure of water therethrough to produce a series of blows against said lug and thereby rotate said chambers, the nozzle on said secondary chamber being adjustable to govern the speed of rotation of said chambers.

7. A sprinkler comprising a primary chamber having a nozzle, a bearing therefor attachable to a water supply, a secondary chamber, a pipe connecting said chambers and for conducting a portion of the water from said primary chamber tangentially to said secondary chamber, a valve within said pipe to regulate the quantity of water passing from said primary chamber to said secondary chamber, a nozzle on said secondary chamber, a striker pivoted in said secondary chamber, and a water impelled means journaled on said striker and eccentrically with respect to the pivot thereof and rotatably actuable to oscillate said striker and thereby produce a rotative movement of said chambers, the nozzle on said secondary chamber being adjustable to vary the angle of direction of the jet issuing therefrom and thereby control the speed at which the chambers are rotated by said striker.

8. A sprinkler comprising a primary chamber having a fixed nozzle, a hollow bearing therefor attachable to a water supply for conducting water thereto and discharging it through said nozzle, a secondary chamber connected to and communicating with said primary chamber for receiving a portion of the water conducted to said primary chamber, a lug in said secondary chamber eccentrically located with respect to said hollow bearing, mechanism operated by the passage of water through said secondary chamber to produce a continuous succession of blows against said lug and thereby rotate said chambers, and a reaction nozzle on said secondary chamber for continuously discharging the water therefrom and adjustable to govern the speed of rotation of said chambers.

GUADALUPE BUELNA.